Oct. 12, 1954  G. A. WEGELE  2,691,263
DISK TYPE LAWN MOWER
Filed Nov. 19, 1951
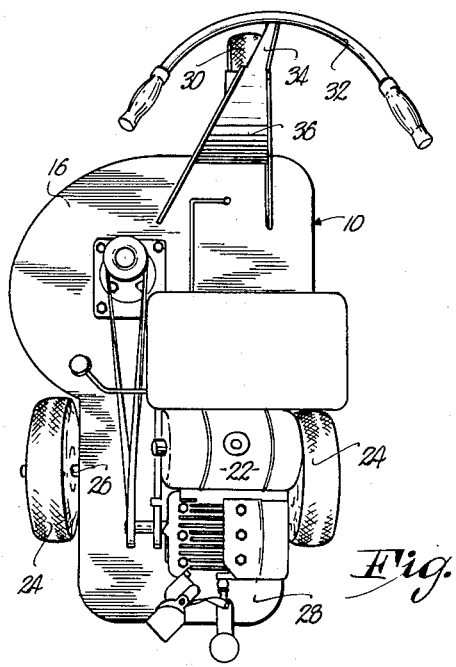
Fig. 1.
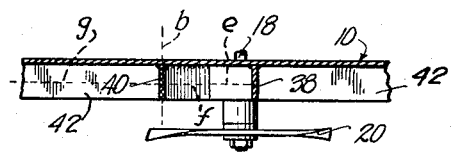
Fig. 3.
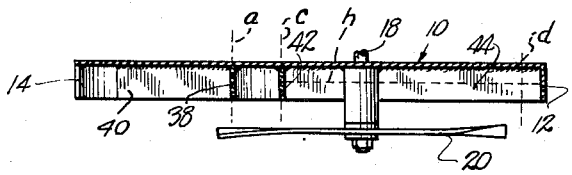
Fig. 4.
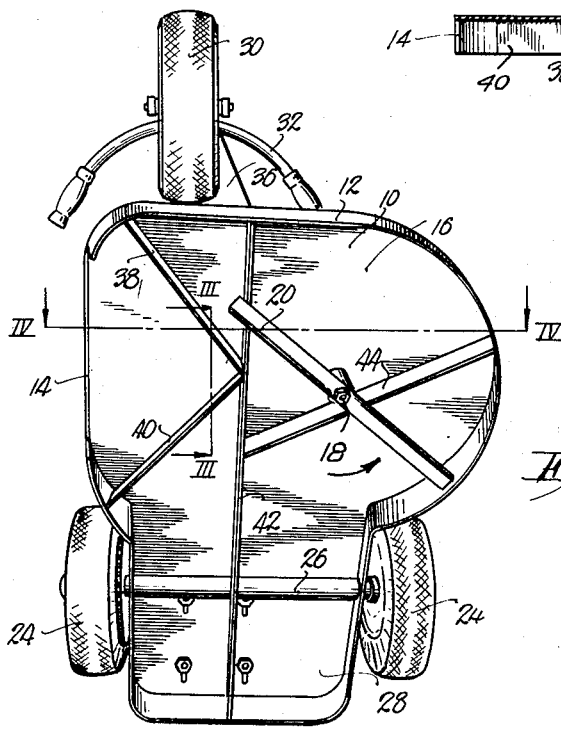
Fig. 2.
INVENTOR.
George A. Wegele
BY
ATTORNEY.

Patented Oct. 12, 1954

2,691,263

UNITED STATES PATENT OFFICE 2,691,263

DISK TYPE LAWN MOWER

George A. Wegele, Otis, Kans.

Application November 19, 1951, Serial No. 257,038

5 Claims. (Cl. 56—25.4)

This invention relates to mowing machines of the type having a cutter blade rotatable on the vertical axis of a shaft or spindle, depending from a horizontal frame or platform, the primary object being to include novel structure for positively controlling the cut grass as, and after the same moves from the machine itself.

Many attempts have heretofore been made to meet the harassing problems inherent in mowing machines of the above-mentioned type relative to the distribution of the cut grass upon the lawn, all without complete success so far as I am aware. The condition of the grass to be cut has a direct bearing upon the ease of cutting and upon the distribution of the grass upon the lawn. Furthermore, the grass has a tendency to "clog" and wind about the cutter spindle, particularly when damp, and it is quite usual in mowing machines of this kind to find that the cut grass is distributed upon the lawn in bunches or in tightly bound, rather hard lumps.

Accordingly, it is the most important object of the present invention to remove all of the aforementioned disadvantages by including on the lowermost face of the horizontal platform, a plurality of particularly arranged and formed flanges adjacent and to one side of the rotating blade thereabove, and all capable of spreading the grass evenly and avoiding jamming or clogging between the blade and the frame or platform and adjacent the spindle.

Another important object hereof is to provide flange structure as above indicated, cooperable with the rotating cutter blade to provide a stop or abutment to hold the rather flimsy blades of grass while the cutter blade operates to sever the same.

A still further object hereof is to provide flange structure capable of directing the cut grass from beneath the platform and spreading the same evenly on the lawn.

Another important object hereof is to provide in a mowing machine, a balanced construction cooperable with the aforesaid flange construction by positioning the ground-engaging wheels in a particular manner relative to the cutter blade, its spindle and the flanges themselves.

In the drawing:

Figure 1 is a top perspective view of a lawn mower made pursuant to my present invention.

Fig. 2 is an inverted perspective view thereof.

Fig. 3 is a fragmentary, detailed, cross-sectional view taken on line III—III of Fig. 2; and Fig. 4 is a transverse, cross-sectional view taken on line IV—IV of Fig. 2 looking in the direction of the arrows.

This is a continuation-in-part of my co-pending application, Serial No. 51,018, filed September 24, 1948, and entitled "Power Lawn Mower," now abandoned.

There is illustrated in the drawing, a normally horizontal flat platform broadly designated by the numeral 10, having a substantially continuous, down-turned flange 12 at its periphery, cutaway at one side thereof only as at 14 to present an outlet for the cut grass. A portion 16 of the platform 10, is substantially semi-circular, said portion 16 being in opposed relationship to the outlet opening 14 and concentrically receiving a vertical shaft or spindle 18 upon which is rigidly secured a horizontal cutter blade 20 for rotation on the longitudinal, vertical axis of shaft 18 in spaced-relationship below the platform 10 and below the lowermost edge of the down-turned flange 12, all as shown clearly in Figs. 3 and 4 of the drawing. The shaft 18 and accordingly, the cutter blade 20, are rotated through the medium of a suitable prime mover such as a gasoline engine broadly designated by the numeral 22. Engine 22 also drives at least one of a pair of rear ground-engaging wheels 24, having a common axle 26 and carried by the flange 12 adjacent a rearwardly extending portion 28 forming a part of the platform 10.

The details of construction relative to the manner of operably connecting the prime mover 22 with the shaft 18, and with one of the rear wheels 24 to drive the latter, together with clutch means and other controls, is of no importance to the present invention and may take the same form as that more particularly described and illustrated in my aforesaid co-pending application.

In addition to the two rear wheels 24, platform 10 is supported by a single forwardmost wheel 30 that also serves to guide the machine by virtue of connection with handle bars 32. The handle bars 32 are joined with a substantially vertical, rotatable shaft 34 carried by an upstanding frame member 36 on the platform 10, said shaft 34 being coupled with the wheel 30 by means of a suitable yoke.

It is important to note at this juncture that the wheels 30 and the shaft 18 are within vertical planes that intersect perpendicularly the axle 26 for rear wheels 24. In other words, the spindle or shaft 18 is on one side of the median longitudinal axis of the platform 10, whereas, the steering wheel 30 is within a vertical plane perpendicular to the axle 26 on the opposite side of the median longitudinal axis of the platform 10.

It is further notable that the shaft 18 is substantially on a transverse axis through the platform 10, midway between the wheel 30 and wheels 24. As will hereinafter appear, such precise arrangement is highly important to proper balance in the mowing machine and to a proper operation of the flange construction about to be described.

In accordance with the present invention, there is provided four down-turned, relatively narrow, elongated flanges 38, 40, 42 and 44 depending from the lowermost face of the platform 10 and confined within the flange 12 thereof. Flanges 38 and 40 have vertical, transverse axes "a" and "b" as shown by dotted lines in Figs. 4 and 3 respectively, and flanges 42 and 44 have vertical, transverse axes "c" and "d" respectively as illustrated by dotted lines in Fig. 4. Flanges 38 and 40 are provided with horizontal, longitudinal axes "e" and "f" respectively shown by dotted lines in Fig. 3, and similarly, flanges 42 and 44 have horizontal, longitudinal axes "g" and "h" as illustrated by dotted lines in Figs. 3 and 4 respectively. The primary flange 42 extends the entire length of the platform 10 in parallelism with the normal path of travel of the machine in perpendicular relationship to the axle 26 and substantially midway between the wheels 24. The flanges 38 and 40 are in relative converging relationship as the flange 42 is approached, the angle between the flanges 38 and 40 being slightly greater than 90 degrees. As is clear in Fig. 2 of the drawing, the flanges 38 and 40 join with each other and with the flange 42 at a common point substantially on a transverse axis through the platform 10, through the spindle 18 and midway between the ends of the elongated opening 14. The ends of the flanges 38 and 40 opposite to the flange 42, connect with the flange 12 on opposite sides of the opening 14. The flange 44 is also angularly displaced relative to the flange 42 and joins the latter with the flange 12 on that side of flange 42 opposite to the flanges 38 and 40.

The disposition of flange 44 relative to flange 42 is substantially the same as the relationship between flanges 40 and 42 except that the angularity is slightly different. It is notable in Fig. 2 of the drawing, that flange 44 is adjacent the spindle 18 and between the latter and the proximal rear wheel 24.

It is to be preferred that the flanges 38, 40, 42 and 44 have a width substantially the same as the width of the flange 12, but more important is the fact that the lowermost longitudinal edges of the four flanges 38, 40, 42 and 44 are spaced above the plane of cutter blade 20 as shown in Figs. 3 and 4.

With this precise and important arrangement of the parts above identified, the operation is substantially as follows:

With the machine moving forwardly and the cutter blade 20 rotating continuously in the direction of the arrow illustated in Fig. 2, the forwardmost length of flange 12 will tend to bend the grass to be cut forwardly, whereupon such grass in turn tends to return to an upright condition toward the lowermost face of platform 10. As soon as the blade 20 comes into contact with the grass, it forces the latter toward the flange 42 while simultaneously cutting the same. By virtue of the fact that flange 42 presents an abutment or stop for the grass well above the point of severance in the horizontal plane of blade 20, the grass is in effect held while the blade 20 acts thereon to perform the severing action. In other words, the grass is held by the roots at one end thereof and by a portion of the flange 42, while the blade 20 cuts the grass between the two points of support. A portion of the standing grass will also be held by the flange 38 to cooperate with the blade 20 in the severing operation; in the event that some of the grass slips past the flange 42 without being cut, the flange 38 catches the same and assures cutting by blade 20. By the time the cut grass reaches the downturned flange 38 in a cut condition, it is ready for leveling by the flange 38 before the same is thrown from the machine through the outlet opening 14. At the same time, the flanges 40 and 44 tend to guide the grass outwardly through the outlet opening 14 rather than permit the same to spin around the shaft 18 and become "jammed" between the rotating blade 20 and the lowermost face of platform 10.

While that portion of the flange 42 extending rearwardly of the flange 44, operates primarily to stabilize the platform 10, any cut grass that tends to slip by the flange 40 and not project through the opening 14, will be stopped by the flange 42 rearwardly of flanges 40 and 44, thereby further preventing spinning and clogging of the grass about and adjacent the spindle 18. Grass that is cut adjacent the line of travel of spindle 18, is held by the flange 44 and forced toward the opening 14 rather than spin with the blade 20 and eventually cause jamming as is usual in machines of this kind.

Actual use of an arrangement of this kind has proved that even after long periods of operation under virtually all conditions, there will be virtually no collection of grass or other foreign matter beneath the platform 10. This is particularly advantageous when attempting to cut lawns that are heavy with dew, or immediately after a rain. The finished lawn has a neat appearance for the reason that the grass is not chopped in a fine condition and does not "bunch" or pass from the machine in large clogs or lumps.

Another factor of extreme importance lies in the ability of the mowing machine hereof to cut grass of virtually any height and tests have proved that even in high weeds, the action is substantially the same as above described.

Having thus described the invention what is claimed as new and desired to be secured by Letters Patent is:

1. In a mowing machine having a horizontal, mobile platform, a spindle depending from the platform, and a horizontal cutter blade carried by the spindle for rotation on a vertical axis, means for guiding cut grass from beneath the platform and spreading the same evenly over the terrain, said means comprising a plurality of elongated flanges rigidly secured to the lowermost face of the platform and each having horizontal longitudinal axes and vertical transverse axes, said flanges depending from the platform, and being spaced above the cutter blade, and disposed within the path of travel of the grass as the latter is deflected by the cutter blade, presenting stops for aiding the cutter blade in its cutting operation, there being a primary flange having its longitudinal axis parallel with the path of travel of the machine, and a pair of flanges on one side of the primary flange and having their longitudinal axes converging as the primary flange is approached, said spindle being on the opposite side of the primary flange.

2. In a mowing machine having a horizontal, mobile platform, a spindle depending from the platform, and a horizontal cutter blade carried by the spindle for rotation on a vertical axis, means for guiding cut grass from beneath the platform and spreading the same evenly over the terrain, said means comprising a plurality of elongated flanges rigidly secured to the lowermost face of the platform and each having horizontal longitudinal axes and vertical transverse axes, said flanges depending from the platform, and being spaced above the cutter blade, and disposed within the path of travel of the grass as the latter is deflected by the cutter blade, presenting stops for aiding the cutter blade in its cutting operation, there being a primary flange having its longitudinal axis parallel with the path of travel of the machine, a pair of flanges on one side of the primary flange and having their longitudinal axes converging as the primary flange is approached, said spindle being on the opposite side of the primary flange, and a fourth flange on said opposite side of the primary flange and in angular relation thereto for retarding wrapping of the grass around the spindle.

3. In a power lawn mower, a flat, substantially horizontal, platform; a transverse, horizontal shaft attached to the platform adjacent the normally rearmost end thereof; a pair of spaced, rear, ground-engaging wheels on the shaft; an upstanding platform portion on the frame at the normally forwardmost end thereof; a steering post rotatably carried by the frame portion within a first vertical plane perpendicular to said axle and intersecting the same inwardly of one of said rear wheels; a shaft carried by the platform for rotation on a vertical axis within a second vertical plane perpendicular to said axle and intersecting the same inwardly of the other of said rear wheels and within a third vertical plane parallel with the axle and substantially midway between the steering post and the axle; a cutting blade mounted on the shaft below the platform; and a ground-engaging, steering wheel mounted on the post, said blade overlapping the paths of travel of said other rear wheel and the steering wheel forwardly of the axle and rearwardly of the steering wheel when the blade is rotating.

4. In a power lawn mower as set forth in claim 3 wherein is provided a plurality of elongated flanges depending, and rigidly secured to the lowermost face of said platform above the cutting blade with their longitudinal axes horizontal and their transverse axes vertical, there being a primary flange having its longitudinal axis between said planes and parallel therewith, and a pair of flanges intersecting said first vertical plane and having their longitudinal axes converging as the primary flange is approached.

5. In a power lawn mower as set forth in claim 3 wherein is provided a plurality of elongated flanges depending, and rigidly secured to the lowermost face of said platform above the cutting blade with their longitudinal axes horizontal and their transverse axes vertical, there being a primary flange having its longitudinal axis between said planes and parallel therewith, a pair of flanges intersecting said first vertical plane and having their longitudinal axes converging as the primary flange is approached, and a fourth flange adjacent the shaft, extending at an angle from the primary flange in a direction opposite to said pair of flanges, and intersecting said second vertical plane.

References Cited in the file of this patent

UNITED STATES PATENTS

| Number | Name | Date |
| --- | --- | --- |
| 2,547,738 | Bosworth | Apr. 3, 1951 |
| 2,564,201 | Hainke | Aug. 14, 1951 |